April 25, 1967   J. C. VAIDEN   3,315,845
CONVOLUTED SPHERICAL BARRIER FOR LIQUID STORAGE TANK
Filed Sept. 27, 1965   3 Sheets-Sheet 1

INVENTOR.
JOHN C. VAIDEN
BY
Constantine A. Michalos
ATTORNEY

April 25, 1967  J. C. VAIDEN  3,315,845
CONVOLUTED SPHERICAL BARRIER FOR LIQUID STORAGE TANK
Filed Sept. 27, 1965  3 Sheets-Sheet 2

INVENTOR.
JOHN C. VAIDEN
BY
Constantine A. Michalos,
ATTORNEY

INVENTOR.
JOHN C. VAIDEN
BY
Constantine A. Michalos
ATTORNEY

United States Patent Office 3,315,845
Patented Apr. 25, 1967

3,315,845
CONVOLUTED SPHERICAL BARRIER FOR LIQUID STORAGE TANK
John C. Vaiden, Wayne, N.J., assignor to The Bendix Corporation, a corporation of Delaware
Filed Sept. 27, 1965, Ser. No. 490,372
4 Claims. (Cl. 222—95)

This invention relates generally to storage tanks and more particularly to a bladder inserted within a one-piece spherical liquid storage tank whereby the liquid may be dicharged in any attitude of the storage tank.

Frequently it is desirable to use a liquid storage tank which may be discharged in any attitude. One of the lightest designs is one in which a compressed gas is used to displace the liquid, keeping the gas and liquid separated by a flexible barrier. Many liquids impose few barrier design problems but certain liquids, especially liquid propellants for rocket engines, are so chemically reactive that the barrier design is quite critical.

Heretofore, a chemically inert barrier, such as a single diaphragm bladder across the equator of a spherical tank was used but this imposed problems. The disadvantages of this type of installation was that in one instance the tank had to be flanged to permit an opening to accept the diaphragm, and in another instance, where a one-piece tank was used, the tank had to be built around the diaphragm.

In the first instance, where there was a need to provide for a two-piece tank, there was a problem of reinforcement of the tank, that is, extra material was needed since local stresses were present at the flanges. This necessitated the use of a heavier tank. The second instance presented the problem in that the diaphragm could not be replaced since it was connected to the tank surface.

This invention provides for a system utilizing a bladder comprised of four diaphragms made of chemically inert relatively stiff material that can be installed and replaced in a one-piece spherical tank. Each diaphragm is convoluted in such a manner so that there will be a controlled extension and collapse of each diaphragm within the spherical tank. That is, each of the diaphragms, when the bladder is partially extended within the tank, is in its free position and it can then be extended in either direction, in a controlled manner, so that it may be cycled between extreme positions without damage. More specifically the convolutions, as applied to each of the diaphragms of the bladder, are so constructed that the overall bladder is spherical when extended, is in the shape of a truncated pyramid when partially collapsed, and is in complete contact of the other diaphragms with no enclosed volume remaining within the center portion of the spherical tank when the tank is completely evacuated. That is, the faces of the pyramid of each diaphragm are convoluted so that their surface area is equalled to the inside area of the spherical segment within which the bladder is extended. That is, each diaphragm is extended outwardly from the center point of the spherical tank against its respective spherical segment, is in convolution form when partially collapsed, and again is extended inwardly towards the center point of the tank when the bladder is in a completely collapsed position.

Therefore, it is an object of this invention to provide an improved bladder having a plurality of integral diaphragms each having a controlled pattern of extension and collapse.

Another object of this invention is to provide a convoluted spherical barrier for liquid storage tanks having a highly efficient and controlled extended, partially collapsed and completely collapsed configuration so as to permit a longer life for said bladder.

A further object of this invention is to provide a novel bladder construction in combination with the one-piece spherical tank which bladder can be readily inserted through a small aperture formed in the tank.

Still a further object of this invention is to provide a bladder having a plurality of convoluted diaphragms formed so that the convolutions are loosely formed so as to provide little random folding when the diaphragms are collapsed.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
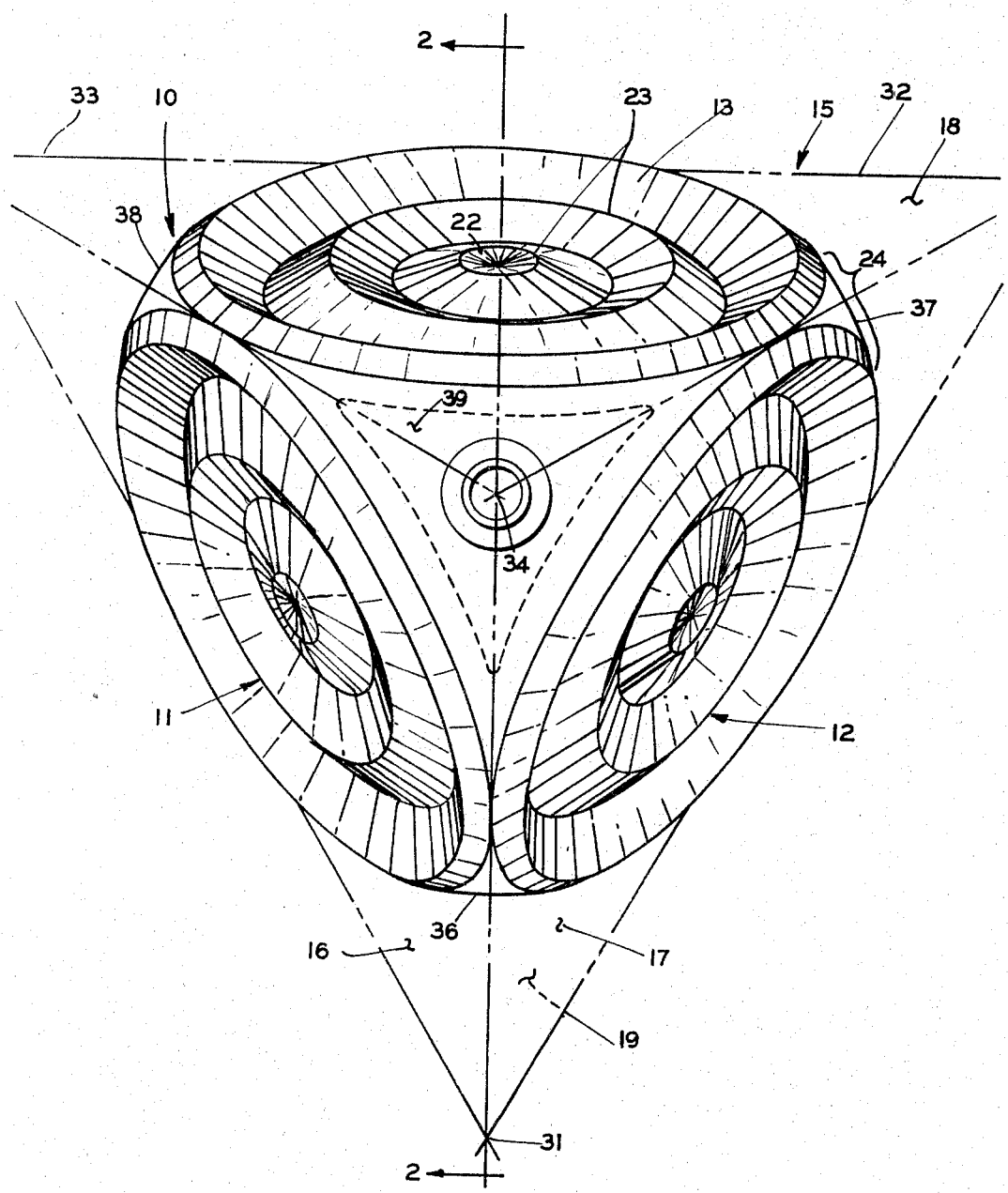
FIGURE 1 shows a perspective view of the free form of the bladder fabricated in accordance with a preferred embodiment of this invention.

The embodiment of this invention primarily provides for a bladder 10 comprised of four convoluted diaphragms 11, 12, 13 and 14. Referring specifically to FIGURE 1, there is shown in phantom a rough configuration from which is fabricated the bladder 10. Initially, the bladder 10 is formed of a hollow pyramid 15, shown in phantom, having four face portions 16, 17, 18 and 19. Each of these face portions are molded into barriers or diaphragms in the form of convoluted discs, such as the diaphragms 11, 12, 13 and 14. Each diaphragm has a free position area equal to the cross-sectional area of a segment of a spherical storage tank 20 shown in FIGURE 3 and has a total surface area equal to the total inside contact area of the tank 20.

The convolutions are so arranged that the material is stretched or compressed a minimum at any extreme position. However, the internal strains that do exist tend to urge each barrier or diaphragm into preferred folds thus avoiding compound folds which are damaging to the material.

Figure 2:
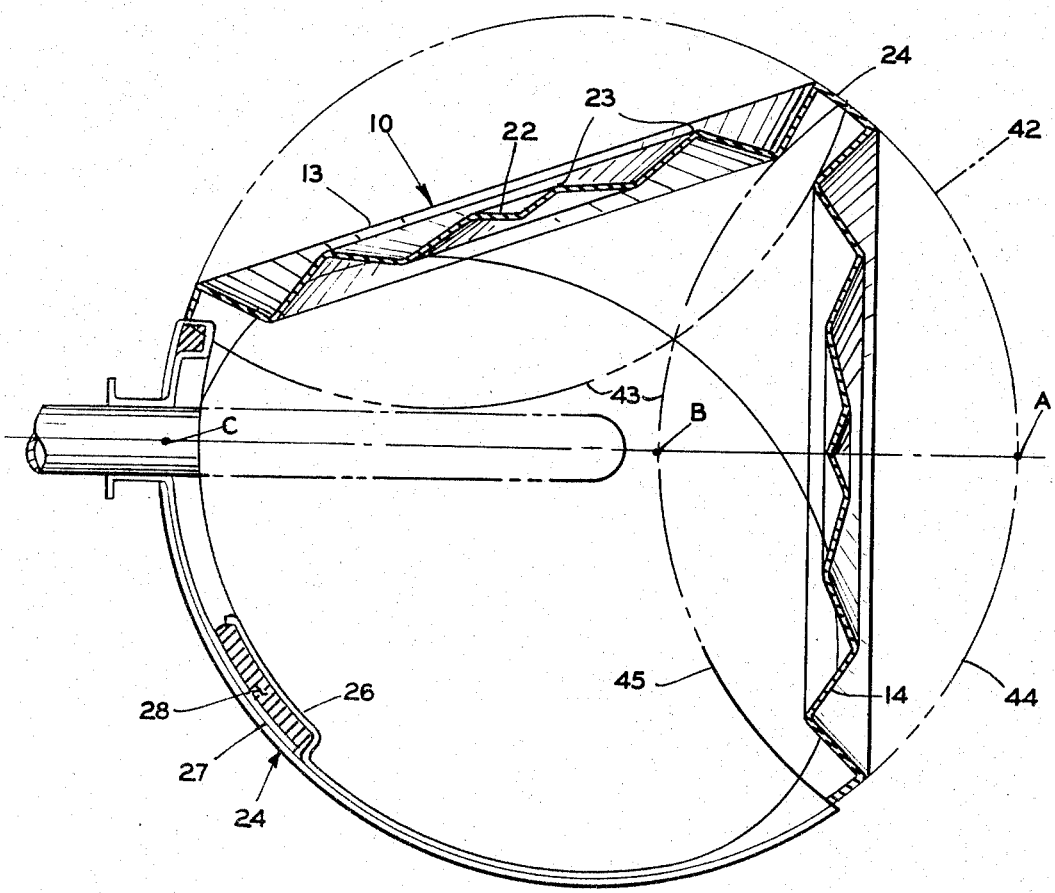
FIGURE 2 shows a sectional view of FIGURE 1 taken substantially along line 2—2.

Shown in FIGURE 2, each diaphragm is comprised of a relatively rigid central portion 22 integral to circular ridges 23, and a peripheral portion 24. The peripheral portion 24 is comprised of two walls 26 and 27, shown in FIGURE 2, containing flexible epoxy 28 which becomes rigid after installation of the diaphragm 10 in the tank 20. More specifically, therefore, each diaphragm, after installation, comprises a rigid central portion 22 and a rigid peripheral portion 24 with a flexible portion, comprised of the ridges 23, therebetween.

In addition, reinforcement may be provided at the ridges and fillets of the folds such that the shape in the transverse plane is held rigidly throughout the axial travel of the diaphragm. The convolutions are so designed that the reinforcements may be of metal rings or of local thickening of the parent material or of fabric material. The rigid restraints will assure freedom from compound folds as brought out before.

In addition, the pyramid 15, shown in phantom in FIGURE 1, is provided with apexes 31, 32, 33 and 34. The apexes, shown in phantom in FIGURE 1, are truncated into segmented spherical configuration surfaces, such as surfaces 36, 37, 38 and 39.

Figure 3:
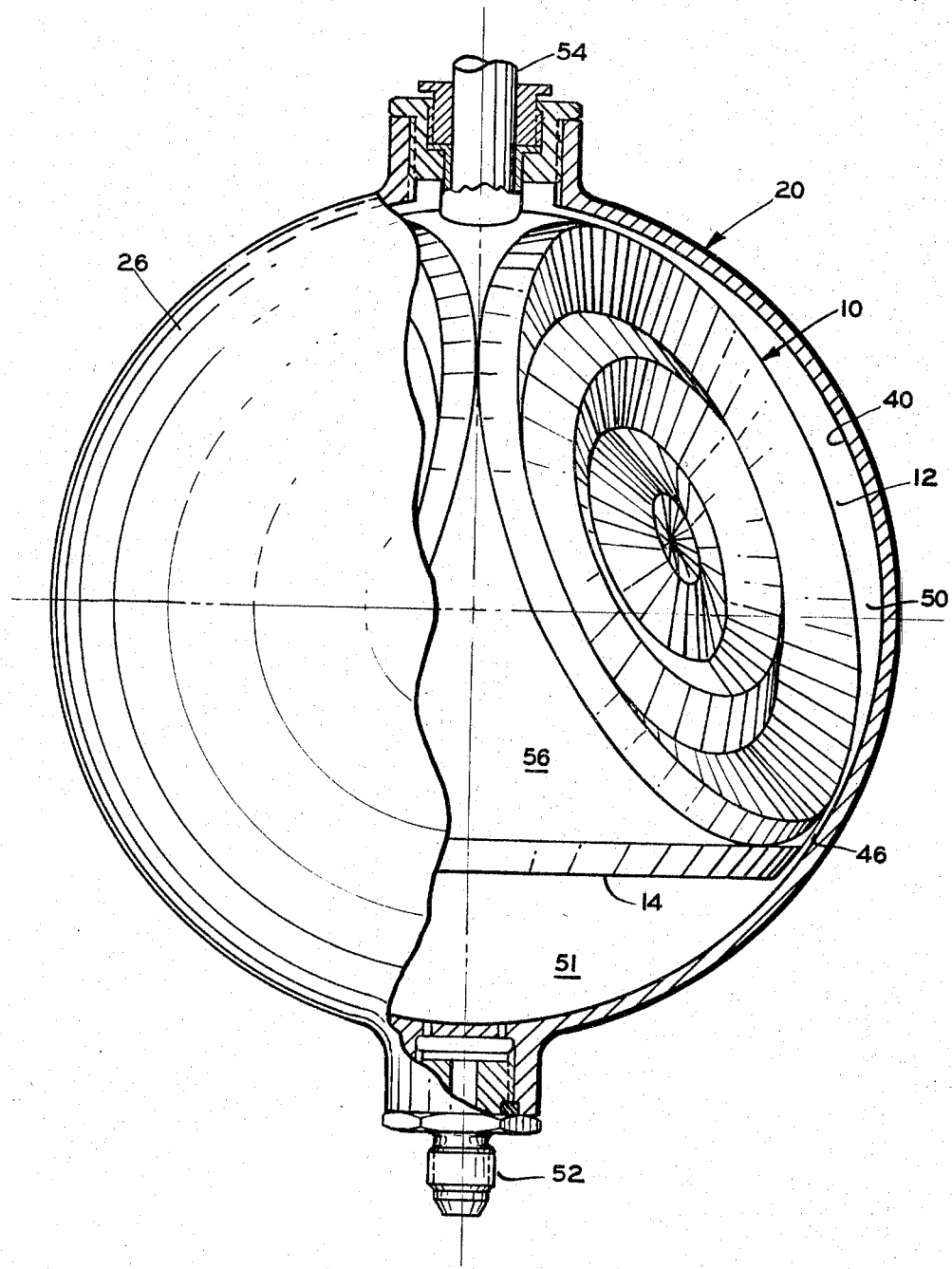
FIGURE 3 shows a complete assembly of the bladder of FIGURE 1 in an installed position within a spherical tank with the spherical tank partially broken away to show the bladder.

The faces 16, 17, 18 and 19 of the pyramid 15 are convoluted so that each of their surface area is equal to the area of the spherical segment subtended. That is, the surface area of diaphragm 12, as best shown in FIGURE 3, is equal to the inside surface area of the spherical segment 40.

As brought out before, the face portions 16, 17, 18 and 19 without the apexes 31, 32, 33 and 34 are convoluted so that the surface area of the bladder 10 is equal to the total inside area of the four spherical segmented portions, such as 40, when the bladder 10 is fully extended to form thereby a true spherical shape as shown by a phantom line 42 in FIGURE 2. When evacuated, the diaphragms collapse upon each other, as shown by phantom lines 43, so that substantially no enclosed volume remains.

It should be therefore noted that the outer convolutions of the diaphragm of the bladder 10 are not as tightly formed as in the case of a diaphragm which is installed across an equator of a spherical tank. That is, little random folding occurs as in the case with equator type bladders.

More specifically, it should be noted that the total travel of a central portion of the diaphragms, such as diaphragm 14, shown in FIGURE 2, from a fully extended position to a fully collapsed position is less than half of the distance of an equator type of diaphragm. That is, the central portion of diaphragm 14 travels from a point A shown in FIGURE 2 to a point B of the same figure. More specifically, the diaphragm 14 substantially conforms to the configuration shown by phantom line 44 when the bladder 10 is fully extended to phantom line 45 when the bladder 10 is fully collapsed. The equator type diaphragm necessitates the travel from the fully extended to the fully collapsed position from point A to point C. Therefore, a single type diaphragm has to extend more than twice as much as the present four diaphragm type.

In the present invention, should the internal force introduced by the molding be insufficient to urge the bladder 10 into the preferred pattern of collapsed condition, additional control may be added for stiffening the physical portion, that is, stiffening the stationary peripheral portion of the bladder. As brought out before, this is accomplished by making the double wall, such as the walls 26 and 27, at the end periphery of each diaphragm and then filling the space therebetween with epoxy resin which hardens after the bladder has been inserted in the tank. Once the epoxy is set, there is produced a ridged circular edge permitting only motion of the bladder confined within the central portion.

In addition, the rigidity of the periphery is needed in the four diaphragms so that the bladder has a constant outside diameter which is smaller than the inside diameter of the spherical tank 20 to thereby form an interconnecting channel 46, shown in FIGURE 3, between the outside chambers formed by the tank and the bladder. That is, each diaphragm forms an outside chamber with the tank, and in addition each diaphragm in combination with the other diaphragms forms a single inside chamber.

Referring more specifically to FIGURE 3, it can be seen that the spherical tank 20 is divided into four outside chambers, such as chambers 50 and 51, by the diaphragms such as diaphragms 12 and 14. The four chambers of the spherical tank are provided with a port 52 for receiving a liquid propellant. In addition, a second port 54 is provided for receiving the pressurized gas which may be nitrogen. The second port 54 is connected to a central chamber 56 formed by the four diaphragms 11, 12, 13 and 14 of the bladder 10.

In the operation of this system, assuming that the tank 20 is fully loaded with the liquid propellant, the diaphragms of the bladder 10 will take the configuration as shown by phantom lines 43. Then the pressure gas, such as nitrogen, can be directed through port 54 within the inside chamber 56 to cause the diaphragms to expand and expel the propellant out of the tank through its port 52. When the propellant has been completely evacuated out of the tank 20, the diaphragms will take a circular configuration form as best shown by phantom line 42 of FIGURE 2.

In summary, therefore, this type of a bladder provides for a free position of a diaphragm which is actually a half way expansion of the bladder 10. The free position is shown in solid line in all the figures, and the extreme positions, such as the fully collapsed position and the fully extended position, is shown in phantom in FIGURE 2. The flow of pressurized gas and the expelling of the propellant, therefore, will be accomplished with little fatigue to the bladder itself.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a spherical storage tank, the combination comprising a plurality of adjacent circular and convoluted diaphragms, each of said diaphragms being interconnected with each of the other of said plurality of diaphragms about the periphery thereof at tangential points common to the periphery of the other of said diaphragms to form a bladder enclosed within said tank, said bladder providing an inner single central chamber, the tank having an inner surface defining with the diaphragms of said bladder a plurality of outer chambers, means for connecting said outer chambers to a propellant, means for connecting the inner central chamber to a pressure means to expand the diaphragms and thereby increase the volume of the central chamber and decrease the volume of the outer chambers to expel the propellant from the storage tank.

2. In a storage tank, the combination comprising a plurality of adjacent circular and convoluted integral diaphragms, each of said diaphragms being interconnected with each of the other of said plurality of diaphragms about the periphery thereof at tangential points common to the periphery of the other of said diaphragms to form a truncated pyramidal bladder structure, a housing having inlet and outlet ports, said bladder being insertable through one of said ports and having a neck portion supported in said one port, said bladder forming an inner chamber connected through said neck portion exteriorly of said tank, and said tank having an inner surface forming with the diaphragms of said bladder a plurality of outer chambers connected to the other of said ports.

3. The structure defined by claim 2 characterized in that the periphery of each circular and convoluted diaphragm tangentially meets the periphery of the adjacent circular and convoluted diaphragms of the other of said diaphragms so as to provide a triangular concave surface on said bladder extending between the adjacent tangential diaphragms, said concave surface including a double wall and an epoxy material between said double wall to maintain the bladder in a truncated pyramidal form, and the bladder having an outer surface positioned in spaced relation to the inner surface of the tank to define therebetween channels for interconnecting the outer chambers to said other port of the tank.

4. A storage tank comprising a one-piece spherical tank having two diametrically opposite ports, a multisided bladder insertable within said tank through one of said ports, said bladder having a neck portion supported by said one port and including truncated pyramidal diaphragm faces, the spherical tank having an inner surface, the diaphragm faces being positioned in spaced relation to the inner surface of the tank so as to form with the inner surface of the tank a plurality of chambers between the bladder and the inner surface of the tank, said chambers being interconnected with the other port of the spherical tank for storing therein a liquid propellant, said bladder defining a central chamber having an opening through said neck portion extending coaxial with the opening of said other port in said spherical tank, and said bladder receiving in said central chamber a pressurized gas applied through said neck portion, each of the diaphragm faces of the bladder including a rigid central portion, central circular ridges coaxial and integral with the central portion, and a rigid peripheral portion coaxial and integral to the circular ridges, each diaphragm having a surface area equal to a segmented portion of the inner surface of the tank, each said segmented portion of the inner surface of the tank being defined by a corresponding diaphragm periphery upon the bladder being expanded, said bladder upon expansion having a diameter slightly less than that of a diameter of the inner surface of the spherical tank so as to permit free flow of the liquid propellant from said chambers to said other port to expel the liquid propellant therethrough as the bladder approaches maximum expansion, and the bladder being operably collapsible so as to decrease the volume of the central chamber defined thereby to a substantially zero volume upon the bladder being so collapsed.

References Cited by the Examiner

UNITED STATES PATENTS

| | | | |
|---|---|---|---|
| 1,270,402 | 6/1918 | Fulton | 29—45 |
| 2,257,737 | 10/1941 | Field | 264—29 |
| 2,387,598 | 10/1945 | Mercier | 222—95 |
| 3,074,402 | 1/1963 | Broman | 128—21 |
| 3,177,281 | 4/1965 | Umansky | 264—29 |
| 3,191,287 | 6/1965 | Hall et al. | 29—45 |
| 3,206,074 | 9/1965 | Hoffman | 222—9 |
| 3,216,621 | 11/1965 | Versaw et al. | 222—9 |
| 3,240,394 | 3/1966 | Modderno | 222—9 |

FOREIGN PATENTS

| | | |
|---|---|---|
| 1,233,679 | 5/1960 | France. |

References Cited by the Applicant

UNITED STATES PATENTS

| | | |
|---|---|---|
| 2,149,298 | 3/1939 | Kuzelka. |
| 2,519,393 | 8/1950 | Noyes. |
| 2,609,118 | 9/1952 | Cattaneo. |
| 2,653,780 | 9/1953 | Pepersack. |
| 2,654,553 | 10/1953 | Noon et al. |
| 2,742,785 | 4/1956 | St. Clair. |
| 2,777,656 | 1/1957 | Clifton. |
| 2,860,648 | 11/1958 | Harrison. |

ROBERT B. REEVES, *Primary Examiner.*

N. L. STACK, *Assistant Examiner.*